(12) United States Patent
Nakahara et al.

(10) Patent No.: US 11,349,399 B2
(45) Date of Patent: May 31, 2022

(54) DC-DC CONVERTER

(71) Applicant: DIAMOND & ZEBRA ELECTRIC MFG. CO., LTD., Osaka (JP)

(72) Inventors: Shogo Nakahara, Osaka (JP); Hiroyoshi Nakayama, Osaka (JP)

(73) Assignee: DIAMOND & ZEBRA ELECTRIC MFG. CO., LTD., Osaka (JP)

( * ) Notice: Subject to any disclaimer, the term of this patent is extended or adjusted under 35 U.S.C. 154(b) by 0 days.

(21) Appl. No.: 17/048,290

(22) PCT Filed: Apr. 24, 2019

(86) PCT No.: PCT/JP2019/017380
§ 371 (c)(1),
(2) Date: Oct. 16, 2020

(87) PCT Pub. No.: WO2020/003719
PCT Pub. Date: Jan. 2, 2020

(65) Prior Publication Data
US 2021/0175809 A1   Jun. 10, 2021

(30) Foreign Application Priority Data

Jun. 25, 2018 (JP) .............................. JP2018-119552

(51) Int. Cl.
*H02M 3/335* (2006.01)
*H02M 1/08* (2006.01)
(Continued)

(52) U.S. Cl.
CPC ......... *H02M 3/33507* (2013.01); *H02M 1/08* (2013.01); *H02M 1/38* (2013.01);
(Continued)

(58) Field of Classification Search
CPC ...... H02M 3/33507; H02M 1/08; H02M 1/38; H02M 3/33569; H02M 3/3376; H02M 1/0058; H02M 3/33576; H02M 3/33584
See application file for complete search history.

(56) References Cited

U.S. PATENT DOCUMENTS 6,937,483 B2 *   8/2005   Zhu ................... H02M 3/33576
                                                         363/17
9,641,089 B2 *   5/2017   Higaki ................ H02M 3/3353
(Continued)

FOREIGN PATENT DOCUMENTS

JP   2013-027201 A   2/2013
JP   2014-075944 A   4/2014
(Continued)

OTHER PUBLICATIONS

International Search Report issued in corresponding International Patent Application No. PCT/JP2019/017380, dated Jun. 11, 2019, with English translation.

*Primary Examiner* — Kyle J Moody
(74) *Attorney, Agent, or Firm* — McDermott Will & Emery LLP

(57) ABSTRACT

The DC-DC converter has a configuration in which a first full-bridge circuit and a second full-bridge circuit are connected via a transformer. A control circuit controls soft switching of each switching element. An inductor current flowing through the transformer or an equivalent inductor equivalent to the transformer at a time of switching of turning on or off each switching element is greater than or equal to a threshold current. When the first full-bridge circuit and the second full-bridge circuit have different output voltages V1 and V2, the control circuit causes the inductor current at start times t4 and t8 of a polarity inversion period to approach the inductor current at end times t5 and t9, the polarity inversion period being a period in which V1 and V2

(Continued)

have reverse polarities. This suppresses an increase in loss resulting from a flow of large current and enables ZVS control.

5 Claims, 9 Drawing Sheets

(51) Int. Cl.
*H02M 1/38* (2007.01)
*H02M 3/337* (2006.01)
*H02M 1/00* (2006.01)

(52) U.S. Cl.
CPC ..... *H02M 3/3376* (2013.01); *H02M 3/33569* (2013.01); *H02M 1/0058* (2021.05)

(56) References Cited

U.S. PATENT DOCUMENTS

| | | | |
|---|---|---|---|
| 11,025,174 B2* | 6/2021 | Watanabe | H02M 3/33584 |
| 11,095,219 B2* | 8/2021 | Watanabe | H02M 3/158 |
| 2015/0229225 A1* | 8/2015 | Jang | H02M 3/33592 363/17 |
| 2016/0020702 A1 | 1/2016 | Trescases et al. | |
| 2016/0156274 A1* | 6/2016 | Miura | H02M 3/33584 363/17 |
| 2021/0167689 A1* | 6/2021 | Nakahara | H02M 1/38 |

FOREIGN PATENT DOCUMENTS

| | | |
|---|---|---|
| JP | 2016-012970 A | 1/2016 |
| JP | 2017-051082 A | 3/2017 |

* cited by examiner

DC-DC CONVERTER

CROSS REFERENCE TO RELATED APPLICATIONS

This application is the U.S. National Phase under 35 U.S.C. § 371 of International Application No. PCT/JP2019/017380, filed on Apr. 24, 2019, which claims the benefit of Japanese Application No. 2018-119552, filed on Jun. 25, 2018, the entire contents of each are hereby incorporated by reference.

TECHNICAL FIELD

The present invention relates to a DC-DC converter that performs soft switching.

BACKGROUND ART

Power converters such as DC-DC converters employ zero voltage switching (hereinafter, referred to as "ZVS") in order to reduce switching losses and achieve high-efficiency power transfer or in order to reduce noise and suppress switching surges so as to enable the use of low-cost, low withstand voltage devices. Patent Document 1 discloses a DC-DC converter capable of high-efficiency power transfer by implementing ZVS operations when there is a large voltage difference between a primary direct-current voltage and a secondary direct-current voltage. The DC-DC converter described in Patent Document 1 detects power on each of the primary and secondary sides and increases or decreases the duties of primary switches and the duties of secondary switches so as to minimize a power difference between the two sides. This allows implementation of ZVS operations.

PRIOR ART DOCUMENT

Patent Document

Patent Document 1: Japanese Patent Application Laid-Open No. 2016-012970

SUMMARY OF INVENTION

Problems to be Solved by Invention

In Patent Document 1, the duties of the primary and secondary switches are controlled. In this case, if on-duty time is short, it may not be possible to pass a sufficient current to accomplish ZVS. On the other hand, if on-duty time is changed in order to pass a sufficient current, an excessive current may flow, thereby causing an increase in loss and a decrease in power transmission efficiency.

In view of this, it is an object of the present invention to provide a DC-DC converter capable of ZVS control while suppressing an increase in loss resulting from a flow of large current.

Means for Solving Problems

In order to solve the above-described problem, a DC-DC converter according to a first aspect of the present invention includes a first full-bridge circuit including four switching elements that include a capacitor serving as a parasitic capacitance or an external parallel-connected capacitor, a second full-bridge circuit including four switching elements that include a capacitor serving as a parasitic capacitance or an external parallel-connected capacitor, a transformer including a first winding and a second winding, the first winding being connected to the first full-bridge circuit, and the second winding being connected to the second full-bridge circuit and magnetically coupled to the first winding, an inductance component connected in series with the first winding or the second winding, and a control circuit that controls soft switching of each switching element in each of the first full-bridge circuit and the second full-bridge circuit. An inductor current flowing through an equivalent inductor at a time of switching of turning on or off each switching element is greater than or equal to a threshold current, the equivalent inductor being equivalent to the transformer and the inductance component. When the first full-bridge circuit and the second full-bridge circuit have different output voltages, the control circuit causes the inductor current at a start time of a polarity inversion period to approach the inductor current at an end time of the polarity inversion period, the polarity inversion period being a period in which an output of the first full-bridge circuit and an output of the second full-bridge circuit have reverse polarities.

A second aspect of the present invention is the DC-DC converter of the first aspect, in which the control circuit adjusts a voltage output period of the first full-bridge circuit in accordance with an input voltage of the first full-bridge circuit, and adjusts a voltage output period of the second full-bridge circuit in accordance with an input voltage of the second full-bridge circuit.

A third aspect of the present invention is the DC-DC converter of the second aspect, in which the control circuit adjusts $\tau_1$ and $\tau_2$ to satisfy:

$$(\tau_2-\tau_c)Vy=(\tau_1-\tau_c)Vx$$

where $\tau_c$ is the polarity inversion period in which the output of the first full-bridge circuit and the output of the second full-bridge circuit have reverse polarities, $\tau_1$ is the voltage output period of the first switching circuit, $\tau_2$ is the voltage output period of the second switching circuit, Vx is the input voltage of the first full-bridge circuit, and Vy is the input voltage of the second full-bridge circuit, $\tau_1$, $\tau_2$, and $\tau_c$ being expressed in radian notation.

A fourth aspect of the present invention is the DC-DC converter of the first to third aspects, in which the threshold current is set such that energy accumulated in the equivalent inductor becomes greater than or equal to energy accumulated in two of the capacitors.

A fifth aspect of the present invention is the DC-DC converter of the fourth aspect, in which the following expression is satisfied:

$$I_{ref}=\alpha \cdot Vx\sqrt{(2C/L)}$$

where $I_{ref}$ is the threshold current, Vx is the input voltage of the first full-bridge circuit, C is a capacitance of the capacitors, L is an inductance of the equivalent inductor, and $\alpha$ is a correction factor.

Advantageous Effects of Invention

According to the first to fifth aspects of the present invention, the inductor current at the start time of the polarity inversion period is caused to approach the inductor current at the end time. Thus, the inductor current at the start time becomes equal to the inductor current at the end time. This reduces a situation where an increase in the inductor current at one of the start time and the end time causes an increase in the inductor current at the other time. Then, a flow of excessive current is prevented. This prevents an increase in loss and suppresses a decrease in power transmission efficiency of the DC-DC converter.

DESCRIPTION OF EMBODIMENTS

An embodiment of the present invention will be described hereinafter with reference to the drawings. The following description takes the example of using a dual-active-bridge (DAB) converter (hereinafter, referred to as a "DC-DC converter") as a "DC-DC converter" according to the present invention.

1. Circuit Configuration of DC-DC Converter

Figure 1:
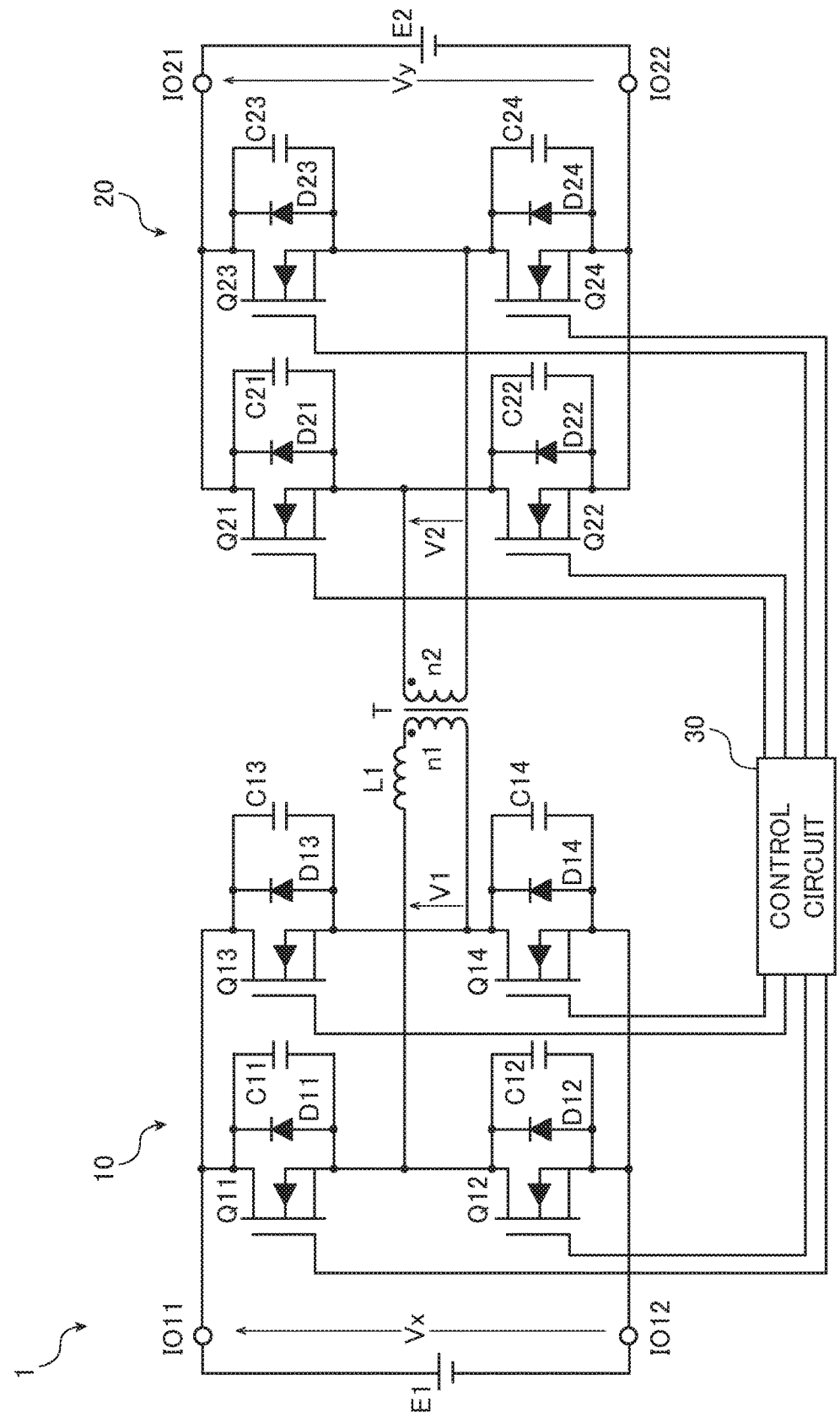
FIG. 1 is a circuit diagram of a DC-DC converter according to an embodiment.

FIG. 1 is a circuit diagram of a DC-DC converter 1 according to an embodiment of the present invention.

The DC-DC converter 1 includes a pair of input/output terminals IO11 and IO12 and a pair of input/output terminals IO21 and IO22. The pair of input/output terminals IO11 and IO12 is connected to a direct-current power supply E1. The pair of input/output terminals IO21 and IO22 is connected to a direct-current power supply E2. In the present embodiment, a power supply voltage Vy of the direct-current power supply E2 is lower than a power supply voltage Vx of the direct-current power supply E1. That is, Vx>Vy.

The DC-DC converter 1 transforms the power supply voltage of the direct-current power supply E1 that is input from the input/output terminals IO11 and IO12, and outputs the transformed voltage from the input/output terminals IO21 and IO22. The DC-DC converter 1 also transforms the power supply voltage of the direct-current power supply E2 that is input from the input/output terminals IO21 and IO22, and outputs the transformed voltage from the input/output terminals IO11 and IO12. That is, the DC-DC converter 1 is a converter capable of bidirectional power transfer.

The DC-DC converter 1 includes a first full-bridge circuit 10, a second full-bridge circuit 20, and a transformer T.

The transformer T includes a first winding n1 and a second winding n2. The first winding n1 and the second winding n2 are magnetically coupled to each other. The first winding n1 is connected to the input/output terminals IO11 and IO12 via the first full-bridge circuit 10. The second winding n2 is connected to the input/output terminals IO21 and IO22 via the second full-bridge circuit 20.

The first full-bridge circuit 10 includes a first leg in which switching elements Q11 and Q12 are connected in series, and a second leg in which switching elements Q13 and Q14 are connected in series. The switching element Q11 is connected in parallel with a diode D11 and a capacitor C11, the switching element Q12 is connected in parallel with a diode D12 and a capacitor C12, the switching element Q13 is connected in parallel with a diode D13 and a capacitor C13, and the switching element Q14 is connected in parallel with a diode D14 and capacitor C14. The switching elements Q11 to Q14 are MOS-FETs. Alternatively, the switching elements Q11 to Q14 may be other transistors such as IGBTs or JFETs. The diodes D11 to D14 may be actual elements or parasitic diodes. Each of the capacitors C11 to C14 may be an actual element, a parasitic capacitance, or a combination of a parasitic capacitance and an actual element.

The first winding n1 of the transformer T is connected to the midpoint of each of the first leg and the second leg. An inductor L1 is provided between the first winding n1 of the transformer T and the midpoint of the first leg. Note that the location of the inductor L1 may be appropriately changed as long as the inductor L1 is connected in series with either the first winding n1 or the second winding n2. For example, the inductor L1 may be provided between the first winding n1 and the midpoint of the second leg. The inductor L1 may be an actual element, a leakage inductance of the transformer T, or a combination of an actual element and a leakage inductance.

The second full-bridge circuit 20 includes a third leg in which switching elements Q21 and Q22 are connected in series, and a fourth leg in which switching elements Q23 and Q24 are connected in series. The switching element Q21 is connected in parallel with a diode D21 and a capacitor C21, the switching element Q22 is connected in parallel with a diode D22 and a capacitor C22, the switching element Q23 is connected in parallel with a diode D23 and a capacitor C23, and the switching element Q24 is connected in parallel with a diode D24 and a capacitor C24. The switching elements Q21 to Q24 are MOS-FETs. Alternatively, the switching elements Q21 to Q24 may be other transistors such as IGBTs or JFETs. The diodes D21 to D24 may be actual elements or parasitic diodes. Each of the capacitors C21 to C24 may be an actual element, a parasitic capacitance, or a combination of a parasitic capacitance and an actual element.

The second winding n2 of the transformer T is connected to the midpoint of each of the third leg and the fourth leg. The aforementioned inductor L1 may be provided between the second winding n2 and the midpoint of either the third leg or the fourth leg.

The gate terminals of the switching elements Q1 to Q14 and Q21 to Q24 are connected to a control circuit 30. The control circuit 30 controls switching of each of the switching elements Q1 to Q14 and Q21 to Q24 so that the output power of the DC-DC converter 1 becomes set target power. In the present embodiment, the control circuit 30 performs soft switching of each of the switching elements Q11 to Q14 and Q21 to Q24 in order to reduce switching losses.

2. Soft Switching Operations

Soft switching operations of the switching elements Q11 to Q14 and Q21 to Q24 will be described hereinafter. The present embodiment adopts 3-level DAB control.

The DC-DC converter 1 transfers power from either the input/output terminals IO11 and IO12 or the input/output terminals IO21 and IO22 to the other, or vice versa. The following description is given on the assumption that the input/output terminals IO11 and IO12 are on the input side (primary side) and the input/output terminals IO21 and IO22 are on the output side (secondary side).

Figure 2:
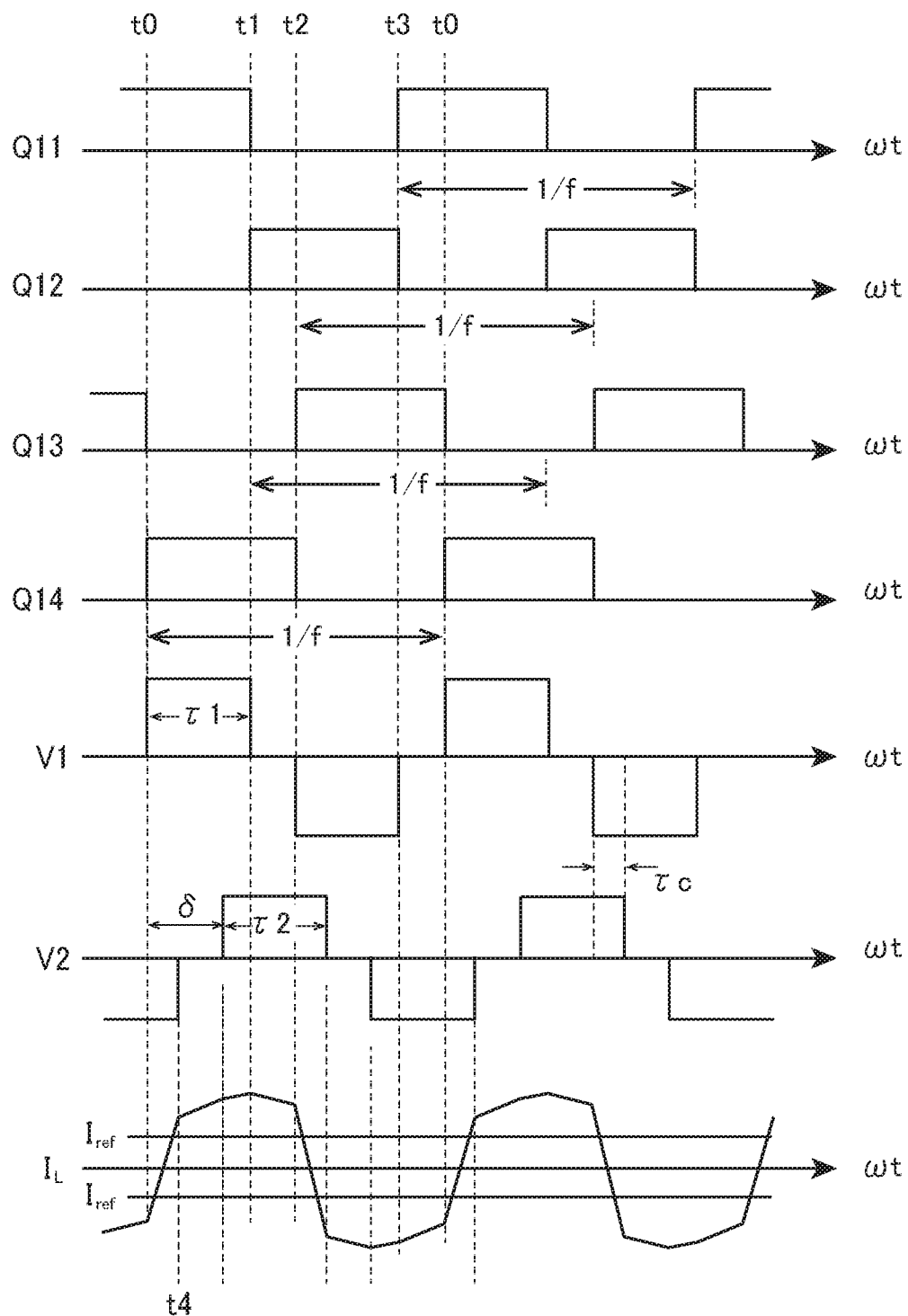
FIG. 2 is a diagram illustrating a timing chart of the DC-DC converter.

FIG. 2 is a diagram illustrating a timing chart of the DC-DC converter 1. FIGS. 3, 4, 5, 6, 7, and 8 are illustrations of current paths in the DC-DC converter 1. In FIGS. 3 to 8, the second full-bridge circuit 20 is not shown, and the inductor L1 and the transformer T in FIG. 1 are expressed as an equivalent inductor L.

The timing chart of only the switching elements Q1 to Q14 in the first full-bridge circuit 10 is illustrated in FIG. 2. In FIG. 2, V1 indicates the voltage between the midpoint of the switching elements Q11 and Q12 and the midpoint of the switching elements Q13 and Q14, illustrated in FIG. 1, and V2 indicates the voltage between the midpoint of the switching elements Q21 and Q22 and the midpoint of the switching elements Q23 and Q24, and $I_L$ indicates an inductor current flowing through the inductor L (see FIGS. 3 to 8).

The control circuit 30 provides a phase difference and controls switching of the first full-bridge circuit 10 and the second full-bridge circuit 20. In the following description, the phase difference between the first full-bridge circuit 10 and the second full-bridge circuit 20 is expressed as δ. The control circuit 30 performs phase-shift PWM control at a switching frequency f (in the cycle of 1/f) on each of the first full-bridge circuit 10 and the second full-bridge circuit 20.

The following description is given of switching control performed on each of the switching elements Q11 to Q14 of the first full-bridge circuit 10. The switching of the second full-bridge circuit 20 is controlled such that the voltage V2 has a waveform illustrated in FIG. 2. This can be described in the same manner as the switching control of the first full-bridge circuit 10. Thus, in FIGS. 3 to 8, only current paths in the first full-bridge circuit 10 are illustrated in order to simplify the description. In each drawing, each switching element is indicated by a simplified graphical symbol.

Period from t0 to t1

In the period from t0 to t1, the switching elements Q11 and Q14 are ON and the switching elements Q12 and Q13 are OFF.

Figure 3:
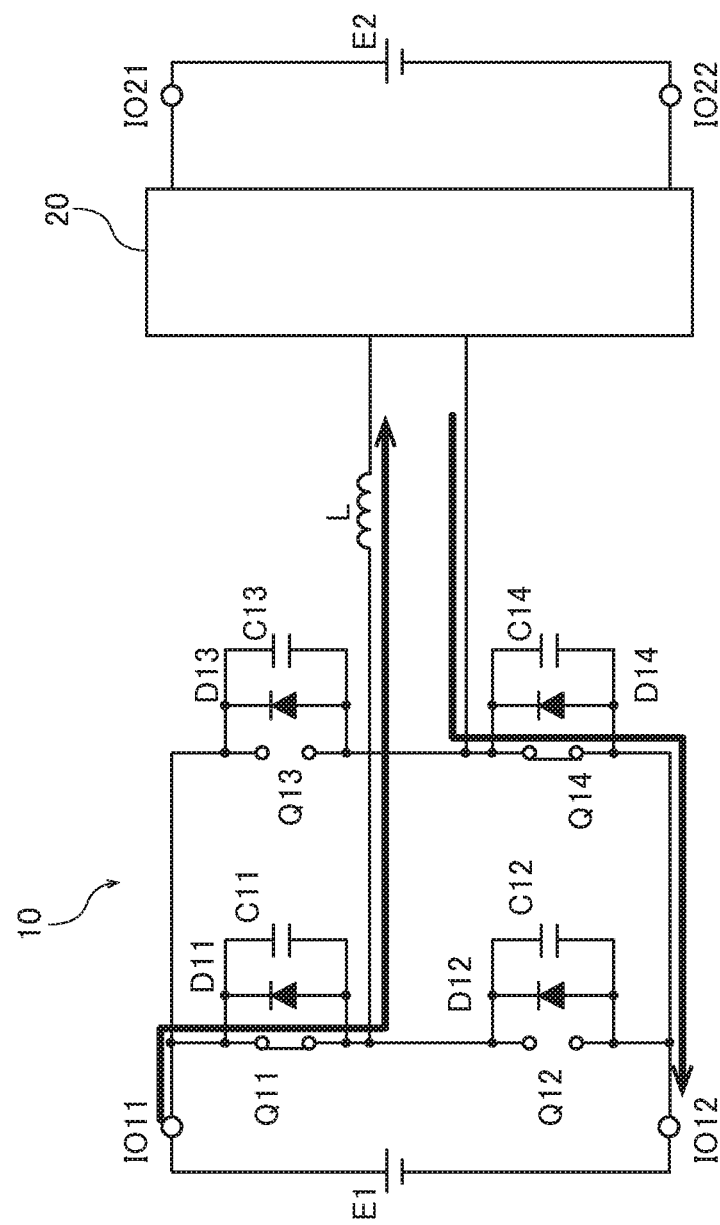
FIG. 3 is an illustration of a current path in the DC-DC converter.

In this case, current flows in sequence from the direct-current power supply E1 through the switching element Q11, the inductor L, the second full-bridge circuit 20, and the switching element Q14 to the direct-current power supply E1 as illustrated in FIG. 3. During this period, the voltage V1 is high.

Figure 4:
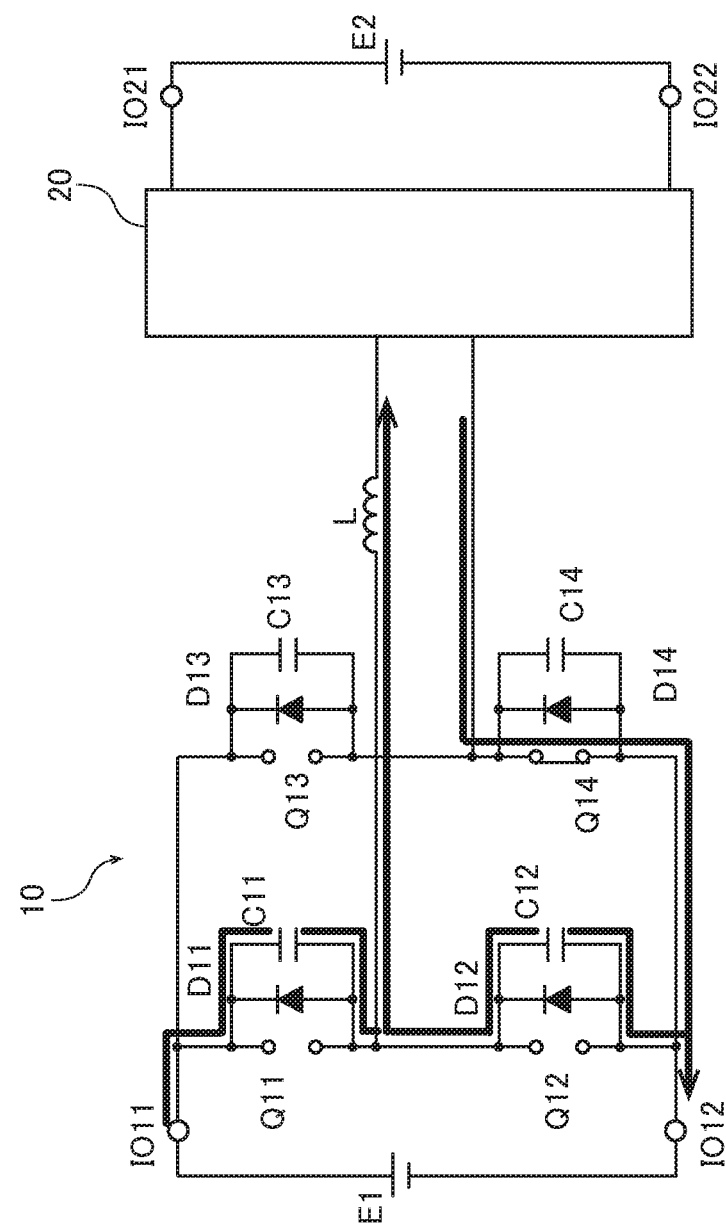
FIG. 4 is an illustration of a current path in the DC-DC converter.

At time t1, the switching element Q11 is turned off, and then the switching element Q12 is turned on after a dead-time interval. During this dead-time interval, the switching elements Q11 and Q12 are both OFF. At this time, the inductor current $I_L$ continues to flow through the inductor L due to the property of the inductor L, so that current flows from each of the capacitors C11 and C12 to the inductor L as illustrated in FIG. 4. Then, the capacitor C11 is charged, and the capacitor C12 is discharged. When the capacitor C12 has been discharged, the drain-source voltage of the switching element Q12 becomes zero. If the switching element Q12 is turned on at this time, this turn-on is achieved by ZVS.

Period from t1 to t2

Figure 5:
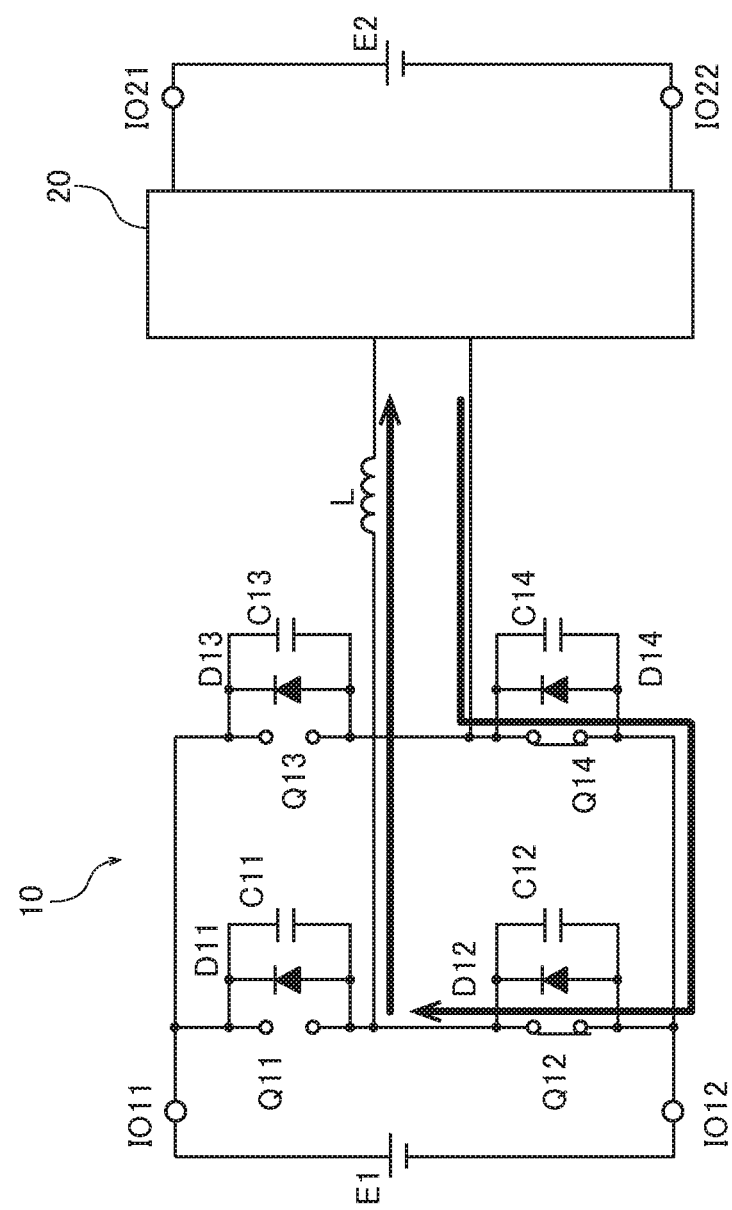
FIG. 5 is an illustration of a current path in the DC-DC converter.

In the period from t1 to t2, the switching elements Q12 and Q14 are ON and the switching elements Q11 and Q13 are OFF. In this case, current flows in a path from the switching elements Q14 and Q12 to the inductor L as illustrated in FIG. 5. At this time, the voltage V1 is zero.

At time t2, the switching element Q14 is turned off, and then the switching element Q13 is turned on after a dead-time interval. During this dead-time interval, the capacitor C14 is charged, and the capacitor C13 is discharged as described with reference to FIG. 4. When the capacitor C13 has been discharged, the drain-source voltage of the switching element Q13 becomes zero. If the switching element Q13 is turned on at this time, this turn-on is achieved by ZVS.

Period from t2 to t3

Figure 6:
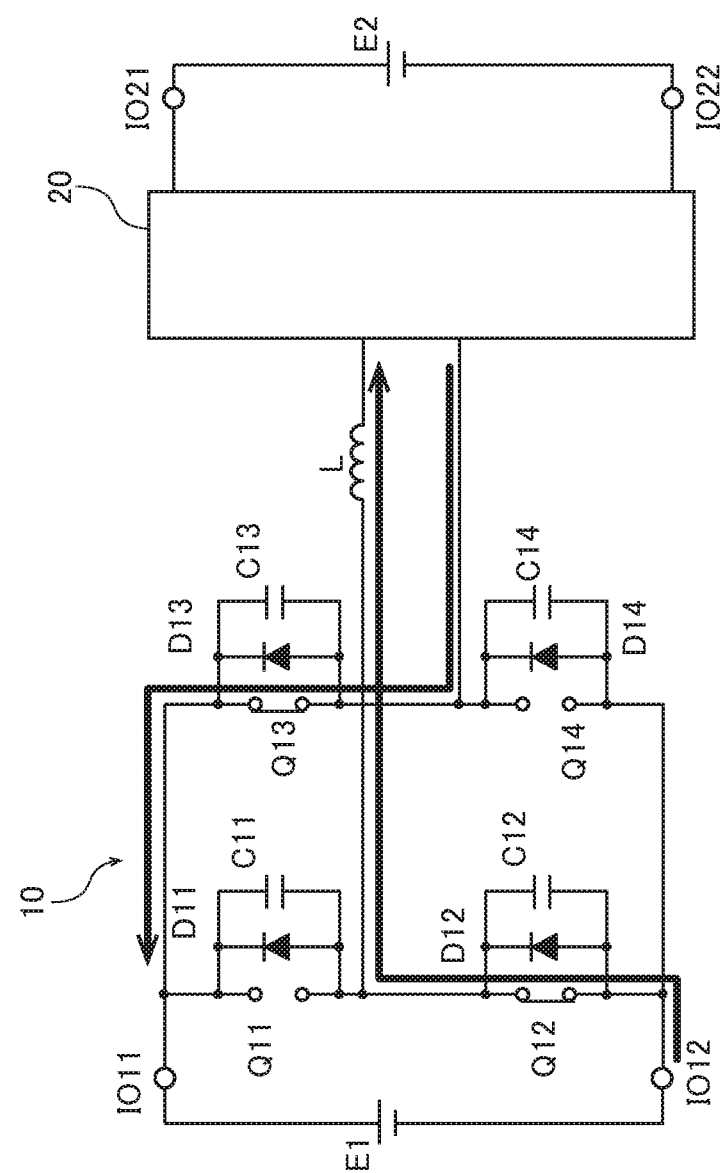
FIG. 6 is an illustration of a current path in the DC-DC converter.
Figure 7:
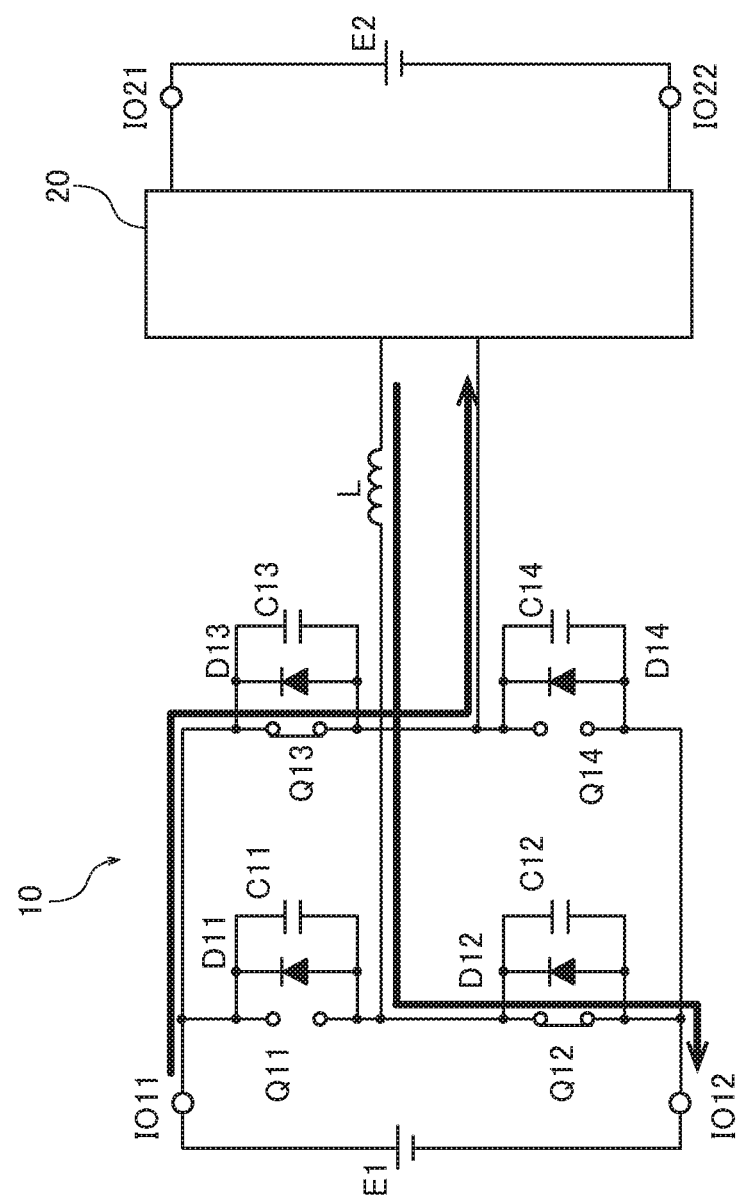
FIG. 7 is an illustration of a current path in the DC-DC converter.

In the period from t2 to t3, the switching elements Q12 and Q13 are ON and the switching elements Q11 and Q14 are OFF. Immediately after the switching element Q13 is turned on at time t2, current flows in a path from the direct-current power supply E1 through the switching element Q12, the inductor L, the second full-bridge circuit 20, and the switching element Q13 to the direct-current power supply E1 as illustrated in FIG. 6. This current flows back to the direct-current power supply E1 and, as a result, current flows in a path from the direct-current power supply E1 through the switching element Q13, the second full-bridge circuit 20, the inductor L, and the switching element Q12 to the direct-current power supply E1 as illustrated in FIG. 7. The polarity of the voltage V1 in this period is the reverse of that in the period from t0 to t1.

At time t3, the switching element Q12 is turned off, and then the switching element Q11 is turned on after a dead-time interval. Then, the capacitor C12 is charged, and the capacitor C11 is discharged as described with reference to FIG. 4. When the capacitor C11 has been discharged, the drain-source voltage of the switching element Q11 becomes zero. If the switching element Q11 is turned on at this time, this turn-on is achieved by ZVS.

Period from t3 to t0

Figure 8:
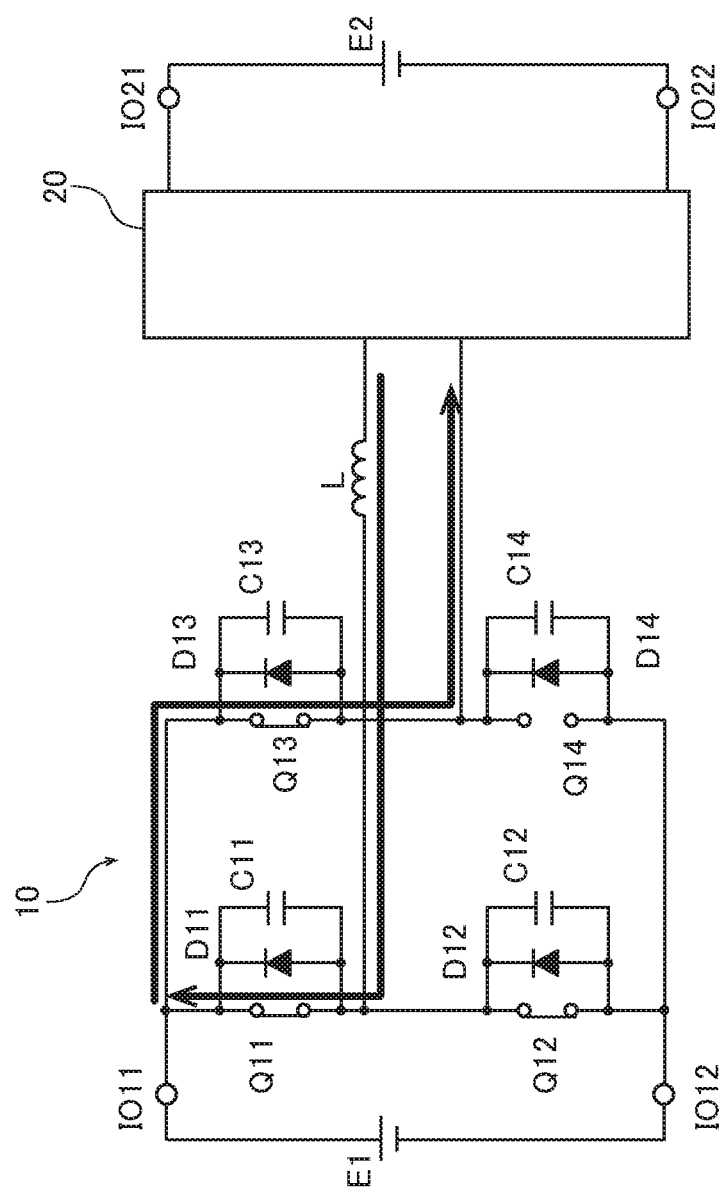
FIG. 8 is an illustration of a current path in the DC-DC converter.

In the period from t3 to t0, the switching elements Q11 and Q13 are ON and the switching elements Q12 and Q14 are OFF. In this case, current flows in a path from the inductor L through the switching element Q11 to the switching element Q13 as illustrated in FIG. 8. At this time, the voltage V1 is zero.

At time t0, the switching element Q13 is turned off, and then the switching element Q14 is turned on after a dead-time period. Then, the capacitor C13 is charged and the capacitor C14 is discharged as described with reference to FIG. 4. When the capacitor C14 has been discharged, the drain-source voltage of the switching element Q14 becomes zero. If the switching element Q14 is turned on at this time, this turn-on is achieved by ZVS. Then, the converter transitions to the state illustrated in FIG. 3.

The switching control as described above causes the voltage V1 to transition so as to have a waveform illustrated in FIG. 2. As a result of the control circuit 30 controlling the switching of the second full-bridge circuit 20, the voltage V2 transitions so as to have a waveform illustrated in FIG. 2. Since, as described above, the switching of the first full-bridge circuit 10 and the second full-bridge circuit 20 is controlled with the phase difference δ, a phase difference between the rising edge of the voltage V1 and the rising edge of the voltage V2 becomes δ.

3. Output Power of DC-DC Converter

The control circuit 30 controls the phase of a drive signal of each switching element to control the output power of the DC-DC converter 1.

In the present embodiment, Vx>Vy. That is, high-level V1 differs from high-level V2. A current flows through the inductor L due to the difference in voltage between V1 and V2. The control circuit 30 according to the present embodiment controls the inductor current $I_L$ during this period as described below in order to enable ZVS of each switching element.

Here, a polarity inversion period in which the voltages V1 and V2 have reverse polarities is expressed as $τ_c$. Also, the voltage output period of the first full-bridge circuit 10 is expressed as $\tau_1$, and the voltage output period of the second full-bridge circuit 20 is expressed as $\tau_2$. Here, $\tau_1$, $\tau_2$, and $\tau_c$ express times in angular (radian) measure.

The control circuit 30 controls the output power of the DC-DC converter 1 by using the voltage output periods $\tau_1$ and $\tau_2$ calculated from V1 and V2 while keeping the polarity inversion period $\tau_c$ constant. The voltage output period $\tau_1$ may be changed by controlling the phase of a drive signal of each switching element in the first full-bridge circuit 10. The voltage output period $\tau_2$ may be changed by controlling the phase of a drive signal of each switching element in the second full-bridge circuit 20.

The fixed value $\tau_c$ is set so as to enable ZVS of each switching element. Thus, $\tau_c$ has to satisfy the condition given by Expression (1) below.

$$\tau_C \geq \frac{I_{ref} \cdot L}{V_x} \quad (1)$$

In Expression (1) above, L is the inductance of the inductor L illustrated in, for example, FIG. 3, and Vx is the power supply voltage of the direct-current power supply E1 (see FIG. 1) as described above.

Also, $I_{ref}$ is the current value of the inductor current $I_L$ required to achieve ZVS. As described above, for example if the drain-source voltage of the switching element Q13 becomes zero after the charge of the capacitor C14 and the discharge of the capacitor C13 during the dead-time interval at time t2, the turn-on of the switching element Q13 is achieved by ZVS. That is, the ZVS of the switching element Q13 becomes possible if the energy of the inductor L is at least greater than or equal to the energy accumulated in each of the capacitors C13 and C14. To achieve this, Expression (2) below has to hold.

$$\frac{1}{2} L I_L^2 \geq \frac{1}{2} \cdot 2 C V_x^2 \quad (2)$$

In expression (2), $I_L$ is the inductor current flowing through the inductor L, and C is the capacitance of each of the capacitors C11 to C14 and C21 to C24. Then, Expression (2) is transformed into Expression (3) below. In Expression (3), α is the correction factor and set to an appropriate value as necessary. Here, it is assumed that α=1.

$$I_L \geq \alpha \cdot V_x \sqrt{\frac{2C}{L}} \quad (3)$$

In Expression (3), $\alpha \cdot V_x \sqrt{(4C/L)}$ is assumed to be the threshold current $I_{ref}$. If $|I_L| \geq |I_{ref}|$ during the dead time intervals at times t0 and t2, ZVS of the switching element Q13 becomes possible. Similarly, if the condition expressed by Expression (3) above is satisfied at the time of turning on each switching element, ZVS of that switching element becomes possible.

In order to enable ZVS of each switching element, the control circuit 30 controls the inductor current $I_L$ in the period in which V1 and V2 have reverse polarities.

Figure 9:
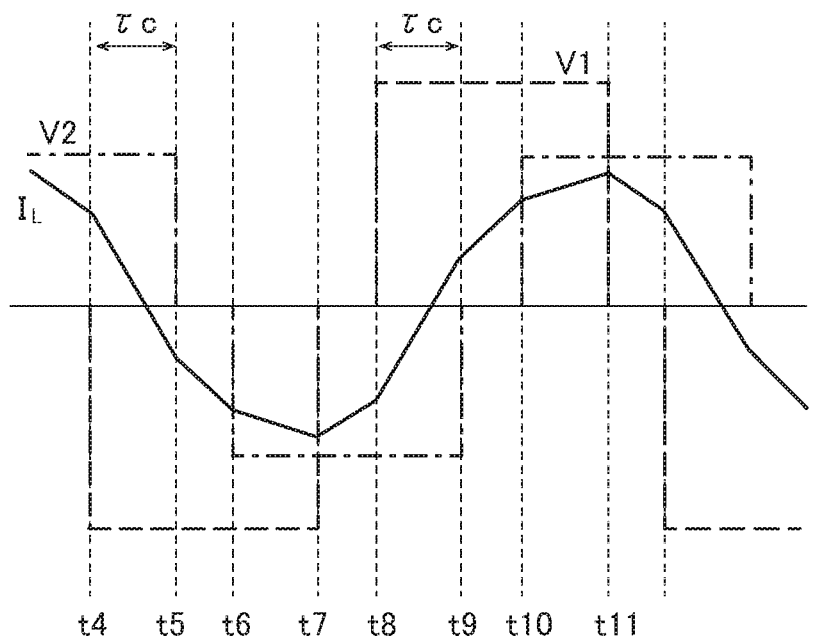
FIG. 9 is a diagram illustrating the waveforms of V1, V2, and $I_L$ in FIG. 2 that are superimposed one above another.

FIG. 9 is an illustration of the waveforms of V1, V2, and $I_L$ in FIG. 2 that are superimposed one above another. In FIG. 9, the broken line indicates the waveform of V1, the dashed dotted line indicates the waveform of V2, and the solid line indicates the waveform of $I_L$.

As illustrated in FIG. 9, the inductor current $I_L$ flowing through the inductor L varies at times t4 to t11 when V and V2 are switched between high and low. Since the difference in voltage across the inductor L is highest in each of the period from t4 to t5 and the period from t8 to t9 in which V1 and V2 have reverse polarities, the inclination of the inductor current $I_L$ during these periods are sharper than that in the other periods.

The inductor current $I_L$ at the start times t4 and t8 of these periods and the inductor current $I_L$ at the end times t5 and t9 of these periods flow in reverse directions. The inductor current $I_L$ at times t5 and t9 is smaller than the inductor current $I_L$ at times t4 and t8. Then, the inductor current $I_L$ at times t5 and t9 is the smallest among the inductor current $I_L$ at each of times t4 to t11 when V1 and V2 are switched between high and low. Accordingly, if the inductor current $I_L$ at times t5 and t9 satisfy the condition expressed by Expression (3) above, ZVS of each switching element becomes possible.

However, if the inductor current $I_L$ at times t5 and t9 is increased, the inductor current $I_L$ at the other times will also increase, and an excessive current will flow. This increases losses and causes a decrease in power transmission efficiency of the DC-DC converter 1. In view of this, the control circuit 30 performs control so as to cause the inductor current $I_L$ at times t5 and t9 to approach the inductor current $I_L$ at times t4 and t8.

The inductor current $I_L$ at times t5 and t9 can be expressed by Expression (4) below.

$$|I_L| = \frac{V2 \cdot \tau_2 - V1 \cdot \tau_1 + 2 \cdot V1(\delta - \pi + \tau_2)}{2\omega L} \quad (4)$$

The inductor current $I_L$ at times t4 and t8 can be expressed by Expression (5) below.

$$|I_L| = \frac{V1 \cdot \tau_1 - 2 \cdot V2(2\pi - 2\delta - \tau_2)}{2\omega L} \quad (5)$$

A condition that $I_L$ expressed by Expression (4) becomes equal to $I_L$ expressed by Expression (5) is expressed by Expression (6) below.

$$(\tau_2 - \tau_c)Vy = (\tau_1 - \tau_c)Vx \quad (6)$$

As expressed by Expression (6), $\tau_1$ and $\tau_2$ are calculated based on the ratio between Vx and Vy. The control circuit 30 controls switching such that $\tau_1$ and $\tau_2$ become values calculated from Expression (6), and the output power of the DC-DC converter 1 becomes a target value. By so doing, the inductor current $I_L$ at times t5 and t9 becomes equal to the inductor current $I_L$ at times t4 and t8. This enables ZVS of each switching element while preventing a flow of large current. As a result, it is possible to suppress an increase in loss resulting from a flow of large current.

4. Variations

While one embodiment of the present invention has been described thus far, the present invention is not intended to be limited to the above-described embodiment.

While Vx>Vy in the above-described embodiment, it is also possible that Vx<Vy. In the above embodiment, $\tau_1$ and $\tau_2$ may satisfy $\tau_1 = \tau_2$, or may satisfy $\tau_1 \neq \tau_2$, and it is sufficient that $\tau_1$ and $\tau_2$ satisfy the condition expressed by Expression (6). In Expression (6), the right and left sides do not necessarily have to match completely.

The above embodiment has been described on the assumption that the input/output terminals IO11 and IO12 are on the input side and the input/output terminals IO21 and IO22 are on the output side. However, the DC-DC converter 1 is capable of bidirectional power transfer. Accordingly, the input/output terminals IO11 and IO12 may be on the output side and the input/output terminals IO21 and IO22 may be on the input side. This case can be described in the same manner as in the above-described embodiment, and therefore a description thereof is omitted. Note that the DC-DC converter 1 does not necessarily have to be a bidirectional converter.

Each element in the above-described embodiments and variations may be combined appropriately within a range that presents no contradictions.

REFERENCE SIGNS LIST

1 DC-DC converter
10 First full-bridge circuit
20 Second full-bridge circuit
30 Control circuit
C11, C12, C13, C14 Capacitor
C21, C22, C23, C24 Capacitor
D11, D12, D13, D14 Diode
D21, D22, D23, D24 Diode
E1, E2 Direct-current power supply
$I_L$ Inductor current
IO11, IO12 Input/output terminal
IO21, IO22 Input/output terminal
L Inductor
L1 Inductor
Q11, Q12, Q13, Q14 Switching element
Q21, Q22, Q23, Q24 Switching element
T Transformer

The invention claimed is:

1. A DC-DC converter comprising:
a first full-bridge circuit including four switching elements that include a capacitor serving as a parasitic capacitance or an external parallel-connected capacitor;
a second full-bridge circuit including four switching elements that include a capacitor serving as a parasitic capacitance or an external parallel-connected capacitor;
a transformer including a first winding and a second winding, the first winding being connected to said first full-bridge circuit, and the second winding being connected to said second full-bridge circuit and magnetically coupled to said first winding;
an inductance component connected in series with said first winding or said second winding; and
a control circuit that controls soft switching of each switching element in each of said first full-bridge circuit and said second full-bridge circuit,
wherein an inductor current flowing through an equivalent inductor at a time of switching of turning on or off each switching element is greater than or equal to a threshold current that is not zero, the equivalent inductor being equivalent to said transformer and said inductance component, and
wherein when said first full-bridge circuit and said second full-bridge circuit have different output voltages, said control circuit controls a value of said inductor current at a start time of a polarity inversion period to approach a value of said inductor current at an end time of said polarity inversion period, the polarity inversion period being a period in which an output of said first full-bridge circuit and an output of said second full-bridge circuit have reverse polarities.

2. The DC-DC converter according to claim 1, wherein said control circuit adjusts a voltage output period of said first full-bridge circuit in accordance with an input voltage of said first full-bridge circuit, and adjusts a voltage output period of said second full-bridge circuit in accordance with an input voltage of said second full-bridge circuit.

3. The DC-DC converter according to claim 2, wherein said control circuit adjusts $\tau_1$ and $\tau_2$ to satisfy:

$$(\tau_2-\tau_c)Vy=(\tau_1-\tau_c)Vx$$

where $\tau_c$ is the polarity inversion period in which the output of said first full-bridge circuit and the output of said second full-bridge circuit have reverse polarities, $\tau_1$ is the voltage output period of said first full bridge circuit, $\tau_2$ is the voltage output period of said second full bridge circuit, Vx is the input voltage of the first full-bridge circuit, and Vy is the input voltage of the second full-bridge circuit, $\tau_1$, $\tau_2$, and $\tau_c$ being expressed in radian notation.

4. The DC-DC converter according to claim 1, wherein said threshold current is set such that energy accumulated in said equivalent inductor becomes greater than or equal to energy accumulated in two of said capacitors.

5. The DC-DC converter according to claim 4, wherein the following expression is satisfied:

$$I_{ref}=\alpha \cdot Vx\sqrt{(2C/L)}$$

where $I_{ref}$ is said threshold current, Vx is the input voltage of said first full-bridge circuit, C is a capacitance of said capacitors, L is an inductance of said equivalent inductor, and $\alpha$ is a correction factor.

* * * * *